(12) United States Patent
Srinivasan

(10) Patent No.: US 6,351,984 B1
(45) Date of Patent: Mar. 5, 2002

(54) INSPECTION METHOD AND DEVICE FOR NON-DESTRUCTIVE ANALYSIS OF A CONTAINER MATERIAL

(75) Inventor: Sudarsan Srinivasan, Fremont, CA (US)

(73) Assignee: Aradigm Corporation, Hayward, CA (US)

(*) Notice: Subject to any disclaimer, the term of this patent is extended or adjusted under 35 U.S.C. 154(b) by 0 days.

(21) Appl. No.: 09/510,901

(22) Filed: Feb. 23, 2000

(51) Int. Cl.$^7$ ................................................. G01M 3/04
(52) U.S. Cl. ........................ 73/40.7; 73/40; 73/41; 73/49.2; 53/425
(58) Field of Search ....................... 73/40, 40.7, 41, 73/49.2; 493/37; 206/461; 53/574, 559, 560, 453, 456; 29/407.01

(56) References Cited

U.S. PATENT DOCUMENTS

| | | | |
|---|---|---|---|
| 3,369,392 A | * 2/1968 | Christensson | 73/49.2 |
| 3,875,790 A | * 4/1975 | Herdzina et al. | 73/40 |
| 4,184,362 A | * 1/1980 | Standley et al. | 73/40.7 |
| 4,506,495 A | * 3/1985 | Romagnoli | 53/559 |
| 5,345,814 A | * 9/1994 | Cur et al. | 73/49.3 |
| 5,361,626 A | 11/1994 | Colligan et al. | |
| 5,363,968 A | 11/1994 | Solomon | |
| 5,499,529 A | 3/1996 | Harris | |
| 5,633,454 A | * 5/1997 | Abe et al. | 73/40 |
| 5,668,307 A | * 9/1997 | Wade | 73/40.7 |
| 5,969,373 A | 10/1999 | Kronberg | |
| 6,021,625 A | * 2/2000 | Cerwin et al. | 53/425 |

FOREIGN PATENT DOCUMENTS

EP       0619230       * 3/1994      ............ 53/434

OTHER PUBLICATIONS

IBM Technical Disclosure Bulletin 26 (12) pp. 6680–6683 (May 1984).*
Stationary Leak Detector Ultratest UL 500, http://www.leyboldvac.de/products/1_test/data/15.htm Printed Dec. 12, 2000.*
Robert L. Demorest, "Recent Developments in Testing the Permeability of Good Barriers", J.Plastic Film and Sheeting 8:109–123. Apr. 1992.
IBM Technical Disclosure Bulletin, Module Helium Detector (1984), vol. 26(12):6680–6683, May 1994.

* cited by examiner

Primary Examiner—Hezron Williams
Assistant Examiner—Michael Cygan
(74) Attorney, Agent, or Firm—Paula A. Borden; Bozicevic, Field & Francis, LLP

(57) ABSTRACT

An inspection system and method for inspecting a container are disclosed. The method comprises directing gas under pressure at the container, then detecting any gas which passes through the container material. Also provided is an inspection system which is integrated into a system for manufacturing the containers, and methods for integrated manufacture and inspection of containers.

6 Claims, 2 Drawing Sheets

INSPECTION METHOD AND DEVICE FOR NON-DESTRUCTIVE ANALYSIS OF A CONTAINER MATERIAL

FIELD OF THE INVENTION

The invention relates generally to methods of non-destructive analysis. More particularly, the invention relates to an inspection method and device for quickly and non-destructively analyzing a container material for the presence of leaks.

BACKGROUND OF THE INVENTION

Closed packages are used to package a wide variety of products, including foods, condiments, and medicines, as well as other products such as batteries, and cosmetics. These packages function to contain and protect the products contained within them. They may also function as barriers to elements that might degrade, corrode, or otherwise compromise the quality of the product, including, for example, moisture, bacteria and other undesired microorganisms, and oxygen. The integrity of the packaging material is therefore of utmost importance, particularly when the contents are medicines. A liquid medicine contained within a package which has defects may slowly leak out undetected, resulting in a lower effective dosage. The medicine may become contaminated with a microbial agent, thereby compromising the health of the individual to whom the medicine is administered.

Various methods have been developed to detect leaks in packaging material. These methods include line scan camera surface inspection systems, LED systems, hydrocarbon leak detection systems, and $SF_6$ detection systems. See, for example, U.S. Pat. Nos. 5,361,626; 5,499,529; 5,363,968; and 5,969,373. Other methods involve testing for flow of a gas such as $CO_2$ or helium leaking from a package. Demorest et al. (1992) *J. Plastic Film and Sheeting* 8:109–123. These methods generally involve introduction of a gas into the package headspace by flushing the package and its contents prior to sealing; forcing the gas into the package after sealing with a pressurized bomb; or providing the gas as a normal component of the product or package. Typically, once the gas is introduced, a pressure differential is induced across the packaging material, and any gas leaks detected. Detection is generally accomplished by infrared detection device or by mass spectrometer. The detection limits of these methods are relatively high, however, and as a consequence, leaks may go undetected.

There is a need in the art for a rapid, sensitive, and effective inspection method which can analyze packaging material for defects before it is filled with a product.

SUMMARY OF THE INVENTION

The present invention provides methods and devices for detecting imperfections in a packaging material prior to filling with a product to be packaged. Packaging materials formed into a packaging unit are inspected or non-destructively analyzed by (1) applying a gas simultaneously with or immediately after forming the packaging unit; (2) detecting any gas which has passed through the packaging material of the packaging unit; and (3) analyzing the detected gas in a manner which makes it possible to quickly determine whether the packaging unit should "pass" inspection based on criteria such as amount of gas measured.

In some embodiments, the packaging unit is a blister, and is formed by mechanical deformation with a piston. The piston has a lumen extending through the piston, through which a gas is forced.

Detection is carried out by a detection means. In some embodiments, the detection means is a thermal conductivity sensor. The detection means can detect leaks as small as about 1 μm to about 0.1 μm in the packaging material.

The detection means may be part of an inspection system, comprising a detection device, and a signal means for transmitting a signal to a filling means, which may be part of a manufacturing system. The signal means transmits either a positive or a negative signal to the filling means. A positive signal is generated in the event that no gas above detection limits is detected, and the filling means fills the packaging unit with product. A negative signal is generated in the event that gas is detected, and the filling means skips the defective packaging unit. Since containers with flaws are not filled with product, there is less product waste. Furthermore, since containers with flaws are not filled with product, the probability that the product will become contaminated with microorganisms, or will become chemically and/or physically altered before dispensing to a user is reduced.

An advantage provided by the inspection system of the present invention is that it can be integrated into a manufacturing system for the manufacture of containers, such as blister packs. Integration of manufacturing and inspection reduces inspection time.

These and other aspects, objects, advantages and features of the present invention will become apparent to those skilled in the art upon reading this disclosure and reviewing the drawings forming a part hereof.

MODES OF CARRYING OUT THE INVENTION

Figure 1A:
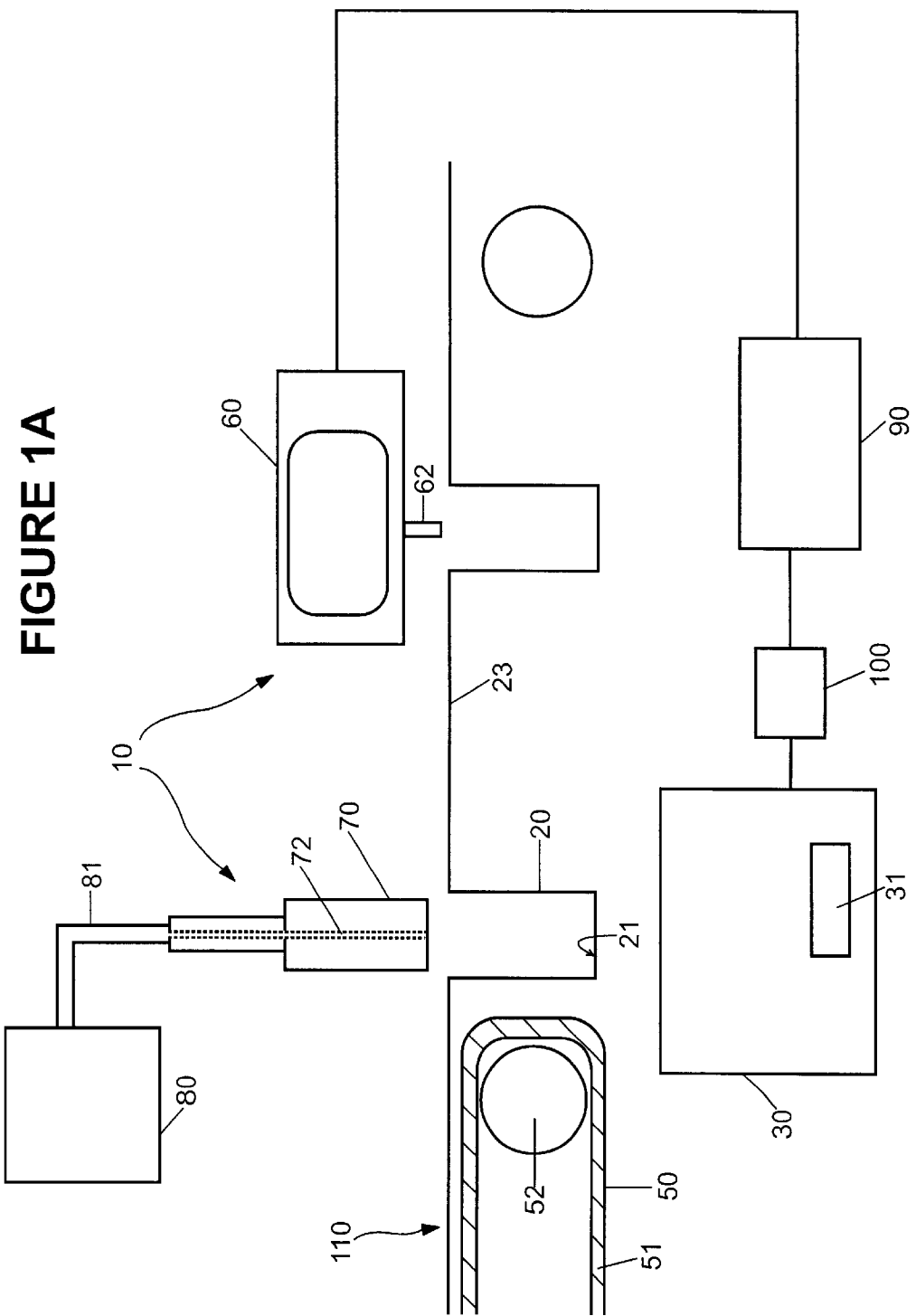
FIGS. 1A and 1B are perspective views of an exemplary embodiment of the inspection system of the invention, integrated into a manufacturing system.

The present invention provides a simple yet effective inspection system for detecting flaws in a container which is to be filled with a product. The inspection system is used in conjunction with a system for manufacturing the containers. The inspection system comprises a detection means which detects and measures gas passing through the container material. The detection means is operably connected to a signal means which provides a signal to the manufacturing system as to whether to fill or ignore the container. The inspection system thus avoids problems associated with defective containers, such as contamination, and/or alteration of physical or chemical properties of the product contained therein. Further, product waste is reduced.

Before the present methods and systems of detecting and analyzing the holes are disclosed, it is to be understood that this invention is not limited to the particular methodology and devices described, as such may, of course, vary. It is also to be understood that the terminology used herein is for the purpose of describing particular embodiments only, and is not intended to limit the scope of the present invention which will be limited only by the appended claims.

It must be noted that as used herein and in the appended claims, the singular forms "a," "an," and "the" include plural referents unless the context clearly dictates otherwise. Thus, for example, reference to "a formulation" includes mixtures of different formulations, reference to "a detection means" includes one or more of such means, and reference to "the method" or "the step" includes reference to equivalent steps and methods known to those skilled in the art, and so forth.

Where a range of values is provided, it is understood that each intervening value between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller range is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the invention, the preferred methods and materials are now described. All publications mentioned herein are incorporated herein by reference to describe and disclose specific information for which the reference was cited.

The publications discussed above are provided solely for their disclosure prior to the filing date of the present application. Nothing herein is to be construed as an admission that the invention is not entitled to antedate such disclosure by virtue of prior invention.

Inspection System

The basic components of an exemplary embodiment of an inspection system operably connected to (i.e., integrated with) a manufacturing system are shown in FIG. 1. Of these components it is necessary to include a gas source under pressure, a means for delivering a stream of gas to an inner surface of the container, the detection means and signal means. The other components, such as a microprocessor, are preferably used in order to increase the accuracy and efficiency of the system. The integrated inspection/manufacturing system preferably includes a means for moving one packaging unit after another into position for inspection, then, if packaging unit passes inspection, filling with product. Each of these components will now be described in further detail.

Container configurations and materials

Containers for holding a product are formed in a sheet of packaging material. A plurality of containers may be formed in a single sheet of material. In some embodiments, the container being inspected is a blister which is part of a blister pack, i.e., a packaging system comprising a plurality of blisters. The blisters may be any of a variety of shapes, including cylinders, cones, cubes, or hemispheres. Blister packs are known in the art, as described in, e.g., U.S. Pat. No. 5,911,325. Blister packs can be provided in any of a variety of arrays, e.g., 2×10, etc.

The packaging material may be any metal or polymer material. Suitable materials include, but are not limited to, metal foils, e.g., aluminum or its alloys; polyolefins such as polyethylene, polypropylene, and polyesters; laminates made of plastic layers and metal layers, in particular plastic films and metal foils; films of thermoplastics such as polyamides, polyvinylchlorides, polyvinylidene chlorides, polyesters such as polyethylene terephthalates, and polyolefins. The thickness of the sheet material is generally in a range of about 5 to about 500, about 25 $\mu$m to about 350 $\mu$m, or about 50 $\mu$m to about 250 $\mu$m thick. In some particular embodiments, the material is ACLAR™. In other particular embodiments, the material is an aluminum foil. In some of these embodiments, the thickness of the material is from about 25 $\mu$m to about 350 $\mu$m.

Each container may optionally be provided with a unique identifier, or "address", which may be in the sheet of material and adjacent to each container. Unique identifiers may be in the form of a bar code or other identification system.

The term "container" is used herein to mean a receptacle for holding and/or storing a drug formulation or other product. The container can be single-dose or multidose, and/or disposable or refillable. The containers may be filled with liquid or solid medication (e.g., tablets, or capsules), or with any other desired product. The contents of each container may comprise a formulation, e.g., a flowable formulation, such as a liquid, flowable formulation, which includes a pharmaceutically active drug or a diagnostic agent, including, e.g., analgesics, narcotics, hormones, hematopoietic drugs, various types of peptides including insulin, and hormones such as erythropoieitin (EPO).

Formation of containers

Containers (a term used interchangebly herein with "packaging unit") can be formed by any known method, including, but not limited to, stretching, stretch-drawing, deep-drawing, and deformation of the material by action of a shaping tool, including, but not limited to, a piston. Deformation can be accomplished by application of mechanical force, application of heat, or a combination of mechanical force and heat.

Gases

Taking as an example use of a piston as shaping tool, the piston will comprise a gas channel extending the length of the piston. The gas channel may extend through the center of the piston, but may also extend through the length of the piston at any location. Alternatively, a plurality of gas channels may extend through the piston. The gas may be any gas which can be detected, including, but not limited to, helium, $SF_6$, a hydrocarbon gas, and $CO_2$.

Gas is applied under pressure to the inner surface of the container. Generally, gas is applied with a force that is greater than atmospheric pressure. In some embodiments, the a pressure applied is about 50 pounds per square inch (psi) or greater.

Detection means

A defect in the container, such as one or more holes, is detected by detecting the presence of gas passing through the container. A detection means ("sensor means") is positioned on the side of the container opposite the side to which gas is applied. Gas can be detected by any known means. A preferred means of detection is with a thermal conductivity sensor.

Using a thermal conductivity sensor, gas can be detected in amounts in the range of from about $0.1 \times 10^{-11}$ to about $1 \times 10^{-13}$, or from about $1 \times 10^{-11}$ to $1 \times 10^{-12}$ about mbar-liter/second.

With these detection limits, holes can be detected in a packaging material that are in a range of from about 100 $\mu$m to about 0.01 $\mu$m, from about 10 $\mu$m to about 0.1 $\mu$m, or from about 5 $\mu$m to about 0.5 $\mu$m.

Sensor means may optionally comprise a readout panel, which may provide information in various formats. For example, a simple "+" or "−" may indicate that gas was ("+") or was not ("−") detected. Alternatively, the readout may be in the form of a series of digits, which provide information regarding the amount of gas detected. Still another possibility is a readout such as "Pass" or "Fail". Any combination of alphanumeric or other symbols can be used to convey the desired information.

Sensor means may also comprise a means for detecting a unique identifier associated with each container, e.g., a bar code or other type of code.

Signal means

The signal means is operably connected to the sensor means, optionally via a microprocessor. The signal means can comprise any means, e.g., electrical, mechanical, and the like, for providing a signal, directly or indirectly, to a filling means, which may be a filling station, of the manufacturing system. If present, a microprocessor may store and process information regarding, e.g., the position of the blister within the blister pack; a unique identifier associated with a container; whether a given container is deemed to have passed or failed the inspection, etc.

Figure 1B:
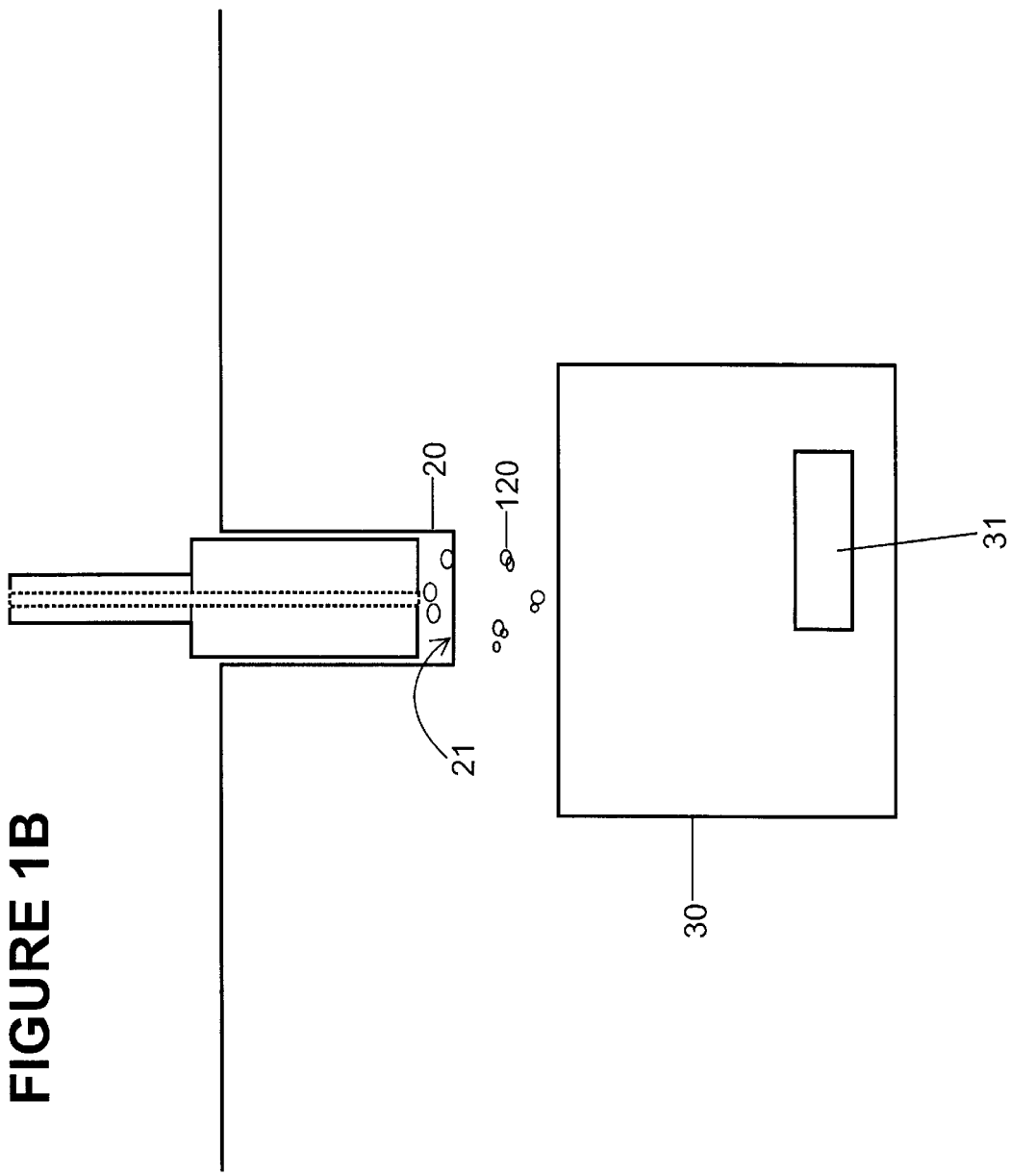

Turning now to the figures, FIG. 1A presents a perspective view of an exemplary embodiment of the invention, with inspection system 10 operably integrated with manufacturing system 110. In this embodiment, blisters 20 are formed in sheet 23 of packaging material by action of a piston 70 on a packaging material. Piston 70 has a gas channel 72 formed by an inner surface of piston 70. Gas flows from gas tank 80 through tubing 81 and through gas channel 72 in piston 70. When piston is engaged within blister, as shown in FIG. 1B, gas is directed at inner surface 21 of blister 20. If a flaw, such as a hole or a plurality of holes, is present in blister 20, gas 120 flows through the flaw, and is detected by sensor 30. Sensor 30 has optional readout 31, indicating presence and/or amount of gas detected.

Sheet 23 of packaging material is conveyed after formation by piston 70 and inspection by inspection system 10 to filling station 60. Any suitable means may be used for conveying the blisters to filling station. In the illustrated embodiment, and endless belt or conveyor 51 is mounted around rollers 52, which form part of the transport assembly 50, and are moved by a drive mechanism (not shown).

If the sensor detects gas above a pre-set limit, this information is conveyed to microprocessor 100, which in turn causes signal means 90 to send signal to filling station 60 not to fill the blister. Blister 20 may be identified by a unique code, which the microprocessor transmits to filling station. Alternatively, a simple "on/off" switch can be actuated to indicate to the filling station that the next blister should not be filled. If sensor does not detect gas above a pre-set limit, microprocessor 100 causes signal means 90 to send signal to filling station 60 to fill the blister. In this exemplary embodiment, the product is a liquid formulation which is contained within a reservoir 61 and dispensed into blister through an outlet 62.

Methods of Detecting Flaws in a Container

The invention provides a method of rapidly inspecting a container for the presence of one or more holes therein. The method comprises directing a gas under pressure onto a packaging material during or immediately after the packaging material is formed into a container. Gas which passes through the container is detected by a detection means. This inspection method can be integrated into the manufacturing of containers. When integrated into a manufacturing system, a gas is applied under pressure through a channel in the shaping tool, e.g., a piston. The detection means is positioned proximal to the container, on the side of the container opposite the side to which gas is applied. The detection means is operably connected to a signal means, optionally via a microprocessor. The signal means sends a signal to a component of the manufacturing system. The manufacturing system comprises means for forming and means for filling the containers, e.g., a filling station. When gas above a pre-set limit is detected, the container is deemed defective, and a signal is sent to the manufacturing system not to fill the defective container. Conversely, if no gas is detected, or is detected at a level below the pre-set limit, the signal means sends a signal to the manufacturing system to proceed to fill the container.

The inspection may be repeated a plurality of times, inspecting a plurality of containers in succession.

Simultaneous Manufacture and Inspection

The present invention is directed towards inspection of container materials for the presence of perforations in the container material. In general, the method is used to scan a packaging material for the presence of holes and make an analysis as to whether or not the packaging material of the packaging unit passes or fails based on detection of gas passing through holes in the material.

The invention is also designed so that packaging units can be analyzed sequentially. More specifically, the device for inspecting the containers can include a means for holding the container in place while it is inspected, and a means for moving one container after another into an inspection position. This type of consecutive inspection procedure is useful during manufacturing.

In an alternative embodiment the invention can be designed so that it specifically affects the actual manufacturing process. Specifically, the method is used to analyze each container as it is created. Specifically, the containers formed in the packaging material by any suitable means such as mechanical or heat deformation of the packaging material with a piston. Simultaneously with or immediately after the piston is forming the container unit, a stream of gas is applied to the inner surface of the container. A detection means is placed on or near the outer surface of the container, i.e., the side opposite the side onto which the gas is directed. When the detector notes that an amount of gas over a pre-set limit is being detected, a signal is sent via a signal means to the manufacturing system to skip filling the defective container. In this manner it is possible to avoid filling defective containers with material. In accordance with this method the detection/analytical components of the invention are integrated with the manufacturing system. Thus, by this method of the invention the inspection and manufacture are truly carried out simultaneously and carried out in a manner which they complement each other.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

What is claimed is:

1. A device for integrated inspection and manufacturing of a plurality of containers, comprising:

a means for directing gas under pressure onto an inner surface of a container, said means for directing a gas being integrated with a shaping tool for forming said container;

a means for detecting gas passing through container;

a signal means, wherein said signal means receives information from said detection means and provides a signal to a filling means; and a means for moving container after another into a position where gas is directed onto an inner surface of each container.

2. A method for inspecting and filling containers, comprising the steps of:
   (a) simultaneously forming a container from a sheet of material while directing a detectable gas at an inside surface of the container;
   (b) detecting gas, if any, on an outside surface of the container;
   (c) sending a signal to a container filling means, which signal is uniquely identified with the container and which indicates whether any gas was detected; and
   (d) instructing said container filling means to fill the container if gas is detected below a pre-set level, and not to fill the container if gas is detected above the pre-set level.

3. The method of claim 2, further comprising repeating steps (a) through (d) a plurality of times.

4. The method of claim 3, wherein containers are formed from a continuous sheet of material.

5. The method of claim 2, wherein the container is filled with a liquid drug.

6. The method of claim 3, wherein containers which are filled are filled with a liquid drug selected from the group consisting of a protein and an analgesic.

* * * * *